(12) United States Patent
Jiang et al.

(10) Patent No.: US 11,811,325 B2
(45) Date of Patent: Nov. 7, 2023

(54) MULTIPHASE SWITCHING CONVERTER WITH TOTAL CURRENT LIMITATION

(71) Applicant: Chengdu Monolithic Power Systems Co., Ltd., Chengdu (CN)

(72) Inventors: Lijie Jiang, Hangzhou (CN); Binci Xu, Hangzhou (CN)

(73) Assignee: Chengdu Monolithic Power Systems Co., Ltd., Chengdu (CN)

(*) Notice: Subject to any disclaimer, the term of this patent is extended or adjusted under 35 U.S.C. 154(b) by 93 days.

(21) Appl. No.: 17/570,708

(22) Filed: Jan. 7, 2022

(65) Prior Publication Data
US 2022/0247317 A1    Aug. 4, 2022

(30) Foreign Application Priority Data
Jan. 29, 2021    (CN) .......................... 202110124783.4

(51) Int. Cl.
*H02M 3/158*    (2006.01)
*H02M 1/32*    (2007.01)

(52) U.S. Cl.
CPC ........... *H02M 3/1584* (2013.01); *H02M 1/32* (2013.01)

(58) Field of Classification Search
CPC .............................. H02M 3/1584; H02M 1/32
See application file for complete search history.

(56) References Cited

U.S. PATENT DOCUMENTS

| | | | |
|---|---|---|---|
| 9,071,142 B2 | 6/2015 | Eric | |
| 9,081,397 B2 | 7/2015 | Lijie | |
| 9,263,876 B2 | 2/2016 | Lijie | |
| 9,356,510 B2 | 5/2016 | Lijie | |
| 9,479,043 B2 | 10/2016 | Lijie | |
| 9,660,534 B2 | 5/2017 | Lijie | |
| 10,348,197 B2 | 7/2019 | Chao | |
| 10,498,241 B2 | 12/2019 | Xiaokang | |
| 2014/0022684 A1* | 1/2014 | Jiang | H02M 3/1584 361/93.1 |
| 2019/0207518 A1* | 7/2019 | Wu | H02M 3/1584 |
| 2020/0007023 A1* | 1/2020 | Wu | H02M 3/1584 |
| 2020/0021189 A1* | 1/2020 | Li | H02M 3/158 |

\* cited by examiner

*Primary Examiner* — Alex Torres-Rivera
(74) *Attorney, Agent, or Firm* — Perkins Coie LLP

(57) ABSTRACT

A controller for a multiphase switching converter has a voltage control circuit, a total current control circuit, a frequency divider and a plurality of sub control circuits. The voltage control circuit provides an on-time control signal based on an output voltage. The total current control circuit provides a current control signal based on a total current flowing through the plurality of switching circuits. The frequency divider receives the on-time control signal, and provides a plurality of frequency division signals based on the on-time control signal. The plurality of sub control circuits provides a plurality of switching control signals to control the plurality of switching circuits respectively. Each of the plurality of sub control circuits receives one of the plurality of frequency division signals and the current control signal, and provides one of the plurality of switching control signals.

20 Claims, 7 Drawing Sheets

MULTIPHASE SWITCHING CONVERTER WITH TOTAL CURRENT LIMITATION

CROSS-REFERENCE TO RELATED APPLICATIONS

This application claims the benefit of CN application 202110124783.4, filed on Jan. 29, 2021, and incorporated herein by reference.

TECHNICAL FIELD

The present invention generally relates to electronic circuits, and more particularly but not exclusively, to multiphase switching converter.

BACKGROUND

Recently, with emergence of high-performance processors, switching converters with smaller output voltage and larger output current are needed, with higher and higher requirements on thermal performance and transient response performance. Multiphase switching converters are widely used because of their superior performance. A multiphase switching converter comprises a plurality of switching circuits, and outputs of the plurality of switching circuits are coupled together to provide an output voltage to a load. However, it is necessary to design a multiphase switching converter, which can not only provide overcurrent protection for each of the plurality of switching circuits, but also ensure a stable operation.

SUMMARY

Embodiments of the present invention are directed to a controller for a multiphase switching converter, the multiphase switching converter having a plurality of switching circuits coupled together to provide an output voltage. The controller comprises a voltage control circuit, a total current control circuit, a frequency divider, a plurality of overcurrent detection circuits, and a plurality of sub control circuits. The voltage control circuit provides an on-time control signal based on the output voltage. The total current control circuit provides a current control signal based on a total current flowing through the plurality of switching circuits. The frequency divider receives the on-time control signal, and provides a plurality of frequency division signals based on the on-time control signal. Each of the plurality of overcurrent detection circuits provides an overcurrent signal to indicate whether a corresponding one of the plurality of switching circuits is overcurrent. The plurality of sub control circuits provide a plurality of switching control signals to control the plurality of switching circuits respectively. Each of the plurality of sub control circuits receives one of the plurality of frequency division signals, the current control signal and the overcurrent signal, and provides one of the plurality of switching control signals accordingly.

Embodiments of the present invention are also directed to a control method for a multiphase switching converter, the multiphase switching converter having a plurality of switching circuits coupled together to provide an output voltage. Providing an on-time control signal based on the output voltage. Providing a current control signal based on the total current flowing through the plurality of switching circuits. Providing a plurality of switching control signals to turn on the plurality of switching circuits successively based on the on-time control signal and the current control signal. When the total current is larger than a current reference, maintaining a corresponding one of the plurality of switching circuits off temporarily, until the total current is less than the current reference, turning on the corresponding one of the plurality of switching circuits based on the output voltage. when a current flowing through the corresponding one of the plurality of switching circuits has exceeded a defined limit, then maintaining the corresponding one of the plurality of switching circuits off, and transiting to control a subsequent one of the plurality of switching circuits.

Embodiments of the present invention are further directed to a controller for a multiphase switching converter, the multiphase switching converter having a plurality of switching circuits coupled together to provide an output voltage. The controller comprises a voltage control circuit, a total current control circuit, a frequency divider, and a plurality of sub control circuits. The voltage control circuit provides an on-time control signal based on the output voltage. The total current control circuit provides a current control signal based on a total current flowing through the plurality of switching circuits. The frequency divider receives the on-time control signal, and provides a plurality of frequency division signals based on the on-time control signal. The plurality of sub control circuits provides a plurality of switching control signals to control the plurality of switching circuits respectively. Each of the plurality of sub control circuits receives one of the plurality of frequency division signals and the current control signal, and provides one of the plurality of switching control signals accordingly.

BRIEF DESCRIPTION OF THE DRAWING

The present invention can be further understood with reference to the following detailed description and the appended drawings, wherein like elements are provided with like reference numerals.

DETAILED DESCRIPTION

Figure 1:
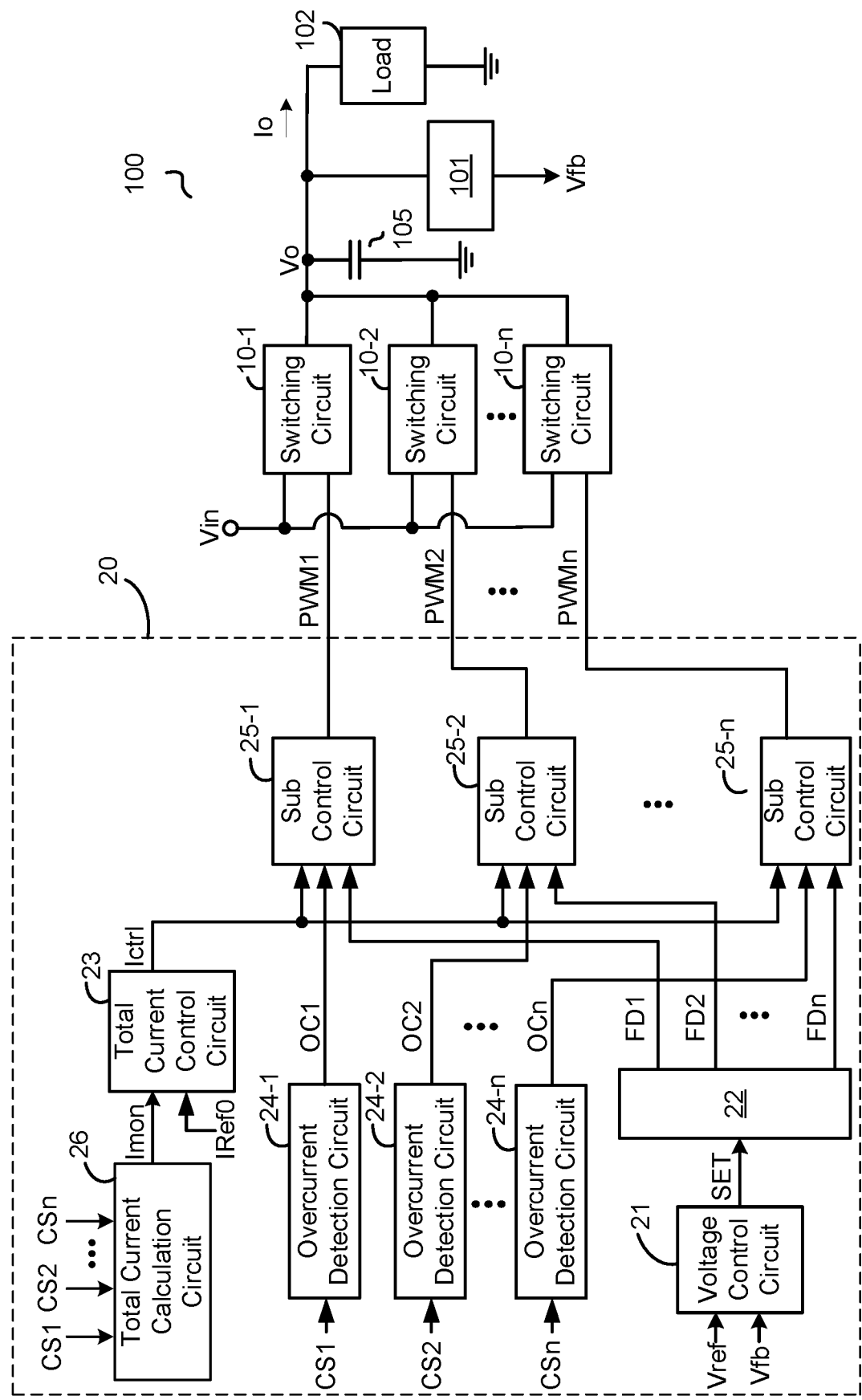
FIG. 1 is a schematic block diagram of a multiphase switching converter 100 in accordance with an embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element. When a signal is described as "equal to" another signal, it is substantially identical to the other signal.

Embodiments of the present invention provide a multiphase switching converter having a plurality of switching circuits. Each switching circuit is turned on successively based on an output voltage of the multiphase switching converter and a total current of the plurality of switching circuits. The "total current" is a sum of a plurality of currents, each of the plurality of currents flows through one of the plurality of switching circuits respectively. In other words, the total current is a current provided to a load by the multiphase switching converter. When the total current is larger than a current reference, a corresponding switching circuit is temporarily maintained off until the total current is less than the current reference, and then the corresponding switching circuit is turned on based on the output voltage. When one of the switching circuits is detected as overcurrent, other of the switching circuits are successively turned on and off normally while the one of the switching circuits is skipped. "Overcurrent" here means that a current flowing through the one of the switching circuits exceeds a defined limit. Embodiments described below employ a constant on-time control as an example.

FIG. 1 is a schematic block diagram of a multiphase switching converter 100 in accordance with an embodiment of the present invention. The multiphase switching converter 100 is configured to provide an output voltage Vo to power a load 102. The multiphase switching converter 100 comprises a controller 20 and a plurality of switching circuits 10-1, 10-2 ... 10-n, where n is an integer larger than or equal to two. The plurality of switching circuits 10-1, 10-2 ... 10-n are coupled in parallel between an input voltage Vin and the output voltage Vo. Switching circuits 10-1, 10-2, ... 10-n can employ any suitable topology, such as synchronous or asynchronous step-up/step-down converters, forward converters, flyback converters, and so on. An output capacitor 105 is coupled between the output voltage and a reference ground.

The controller 20 provides a plurality of control signals PWM1, PWM2 ... PWMn to control the plurality of switching circuits 10-1, 10-2 ... 10-n respectively. The controller 20 comprises a voltage control circuit 21, a frequency divider 22, a total current control circuit 23, and a plurality of sub control circuits 25-1, 25-2 ... 25-n. The voltage control circuit 21 provides an on-time control signal SET based on the output voltage Vo and a voltage reference Vref, e.g., via comparing the output voltage Vo with the voltage reference Vref. The frequency divider 22 has an input terminal and a plurality of output terminals, wherein the input terminal of the frequency divider 22 is coupled to the voltage control circuit 21 to receive the on-time control signal SET, and the plurality of output terminals of the frequency divider 22 provide a plurality of frequency division signals FD1, FD2 ... FDn respectively based on the on-time control signal SET. The total current control circuit 23 provides a current control signal Ictrl based on the total current Io and a current reference Iref0, e.g., via comparing a current feedback signal Imon representative of the total current Io with the current reference Iref0. A sub control circuit 25-$i$ ($i=1, 2 ... n$) has a first input terminal, a second input terminal and an output terminal. The first input terminal of the sub control circuit 25-$i$ is coupled to a corresponding output terminal of the frequency divider 22 to receive a corresponding frequency division signal FD$i$. The second input terminal of the sub control circuit 25-$i$ is coupled to the total current control circuit to receive the current control signal Ictrl. The output terminal of the sub control circuit 25-$i$ is configured to provide a corresponding switching control signal PWM$i$ based on the frequency division signal FD$i$ and the current control signal Ictrl. In one embodiment, when the current feedback signal Imon is larger than the current reference Iref0, the corresponding switching circuit 10-$i$ remains off temporarily, until the current feedback signal Imon is less than the current reference Iref0, the corresponding switching circuit 10-$i$ is turned on based on the output voltage Vo and the voltage reference Vref. E.g., when a voltage feedback signal Vfb is less than the voltage reference Vref, the corresponding switching circuit 10-$i$ is turned on.

In one embodiment, the controller 20 further comprises a plurality of overcurrent detection circuits 24-1, 24-2 ... 24-$n$. An overcurrent detection circuit 24-$i$ ($i=1, 2 ... n$) has an input terminal and an output terminal. The input terminal of the overcurrent detection circuit 24-$i$ is coupled to the corresponding switching circuit 10-$i$ to detect whether the corresponding switching circuit 10-$i$ is overcurrent based on a current flowing through the corresponding switching circuit 10-$i$, and provides an overcurrent signal OC$i$ at the output terminal. For example, based on a current sensing signal CS$i$ ($i=1, 2 ... n$) representative of the current flowing through the corresponding switching circuit 10-$i$, the overcurrent detection circuit 24-$i$ provides the overcurrent signal OC$i$ to indicate if the corresponding switching circuit 10-$i$ is overcurrent. In one embodiment, when the corresponding switching circuit 10-$i$ is detected as overcurrent, the corresponding switching circuit 10-$i$ is skipped, for example, keeping the corresponding switching circuit 10-$i$ off and turning on and off other switching circuits normally. In one embodiment, the sub control circuit 25-$i$ ($i=1, 2 ... n$) further has a third input terminal. The third input terminal of the sub control circuit 25-$i$ is coupled to the output terminal of the overcurrent detection circuit 24-$i$ to receive the overcurrent signal OCi. The output terminal of the sub control circuit 25-*i* provides the corresponding switching control signal PWMi further based on the overcurrent signal OCi.

In one embodiment, the controller 20 further comprises a total current calculation circuit 26. The total current calculation circuit 26 has a plurality of input terminals and an output terminal, the plurality of input terminals of the total current calculation circuit 26 are respectively coupled to the plurality of switching circuits 10-1, 10-2 . . . 10-*n* to receive the plurality of current sensing signals CS1, CS2 . . . CSn, and the output terminal of the total current calculation circuit 26 provides the current feedback signal Imon representative of the total current Io based on the plurality of current sensing signals CS1, CS2 . . . CSn.

In one embodiment, the multiphase switching converter 100 further comprises a voltage sense circuit 101. The voltage sense circuit 101 senses the output voltage Vo and provides the voltage feedback signal Vfb based on the output voltage Vo. In one embodiment, the controller 20 also has a slope compensation circuit that provides a slope compensation signal, which can be superimposed to the voltage feedback signal Vfb, or subtracted from the voltage reference Vref.

Figure 2:
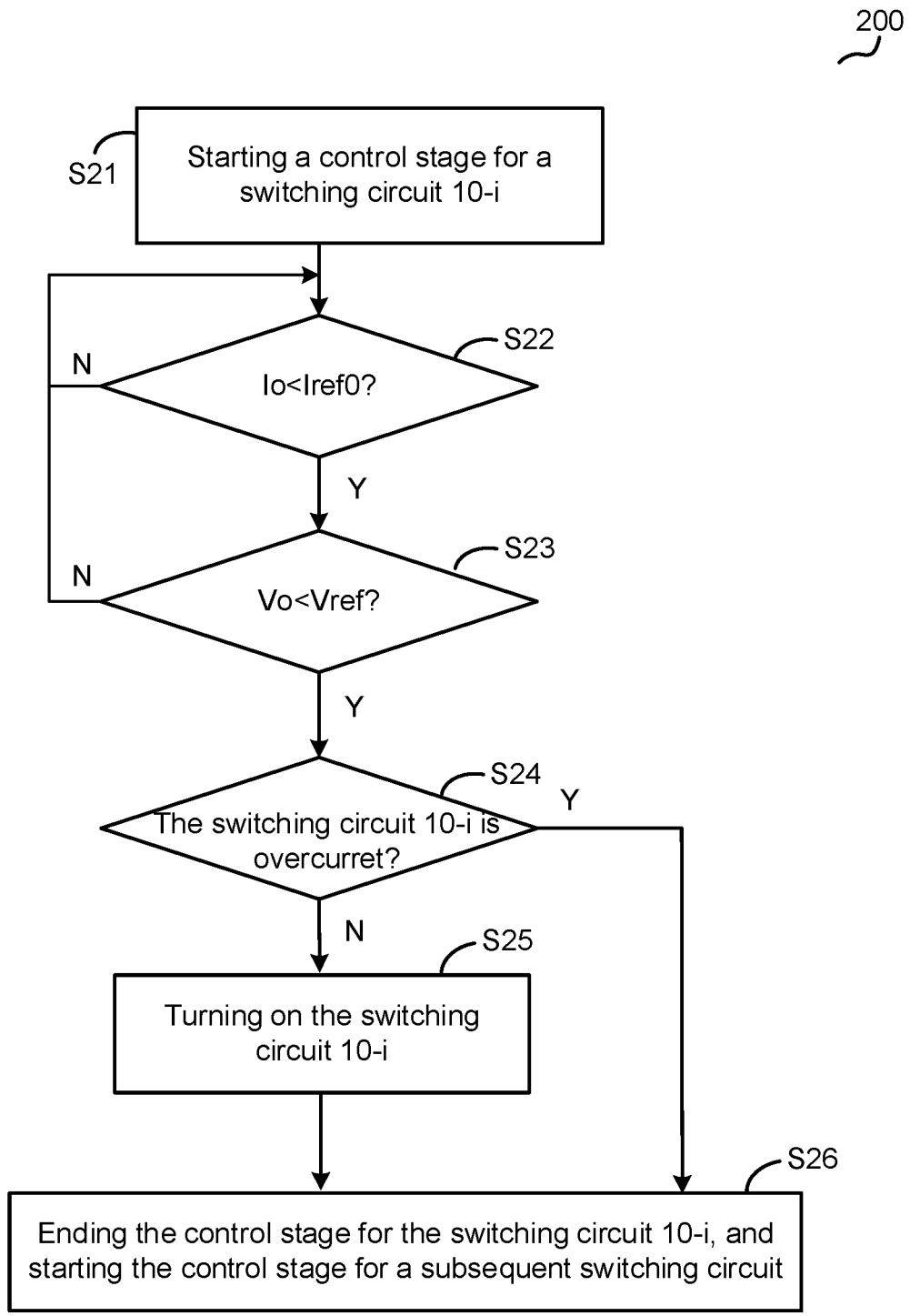
FIG. 2 is a flowchart of a control method 200 for a multiphase switching converter in accordance with an embodiment of the present invention.

FIG. 2 is a flowchart of a control method 200 for a multiphase switching converter in accordance with an embodiment of the present invention, comprising steps S21-S26.

At step S21, starting a control stage for a switching circuit 10-*i*.

At step S22, judging whether the total current Io is less than the current reference Iref0. If yes, then go to step S23.

At step S23, judging whether the output voltage Vo is less than the voltage reference Vref. If yes, then go to step S24, otherwise back to step S22.

At step S24, judging whether the switching circuit 10-*i* is overcurrent. If yes, then go to step S26, otherwise go to step S25.

At step S25, turning on the switching circuit 10-*i*, and then go to step S26.

At step S26, ending the control stage for the switching circuit 10-*i*, and starting the control stage for a subsequent switching circuit.

Control of the total current Io by the multiphase switching converter 100 increases safety of the load. The multiphase switching converter 100 can automatically and smoothly transits between adjusting the output voltage Vo and the total current Io, and current imbalance can be avoided between the plurality of switching circuits caused by a continuous increase of the total current Io.

Figure 3:
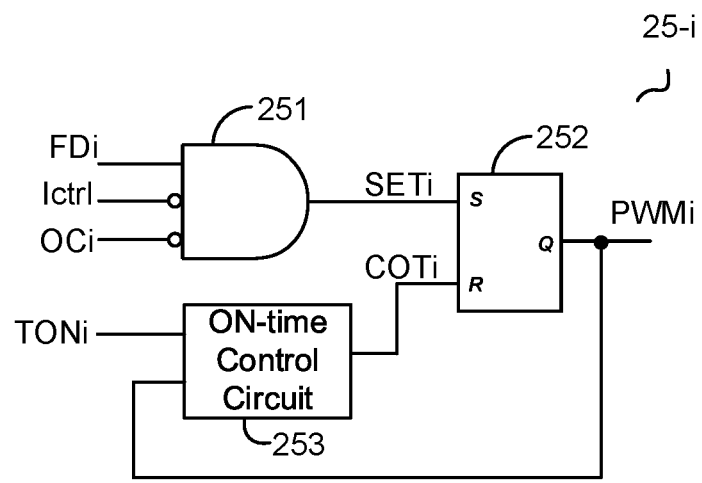
FIG. 3 is a schematic diagram of a sub control circuit 25-$i$ shown in FIG. 1 in accordance with an embodiment of the present invention.

FIG. 3 is a schematic diagram of a sub control circuit 25-*i* shown in FIG. 1 in accordance with an embodiment of the present invention. As shown in FIG. 3, the sub control circuit 25-*i* comprises a logic circuit 251 and a RS flip-flop 252. The logic circuit 251 has a first input terminal, a second input terminal and an output terminal. The first input terminal of the logic circuit 251 is coupled to the corresponding output terminal of the frequency division circuit 22 to receive the frequency division signal FDi. The second input terminal of the logic circuit 251 is coupled to the total current control circuit 23 to receive the current control signal Ictrl. The output terminal of the logic circuit 251 provides the set signal SETi based on the frequency division signal FDi and the current control signal Ictrl. In one embodiment, the logic circuit 251 further comprises a third input terminal to receive the overcurrent signal OCi. The logic circuit 251 provides the set signal SETi further based on the overcurrent signal OCi. The RS flip-flop 252 has a set terminal S, a reset terminal R, and an output terminal Q. The set terminal S is coupled to the logic circuit 251 to receive the set signal SETi. The reset terminal R receives an on-time period control signal COTi to control an on-time period of the switching circuit 10-*i*. And the output terminal Q is coupled to the switching circuit 10-*i* to provide the switching control signal PWMi.

In one embodiment, the sub control circuit 25-*i* further comprises an on-time control circuit 253. The on-time control circuit 253 provides the on-time period control signal COTi according to the switching control signal PWMi and an on-time period signal TONi to control the on-time period of the corresponding switching circuit 10-*i*. The on-time period signal TONi of the switching circuit 10-*i* may be a constant value or a variable value related to the input voltage Vin and/or the output voltage Vo.

Figure 4:
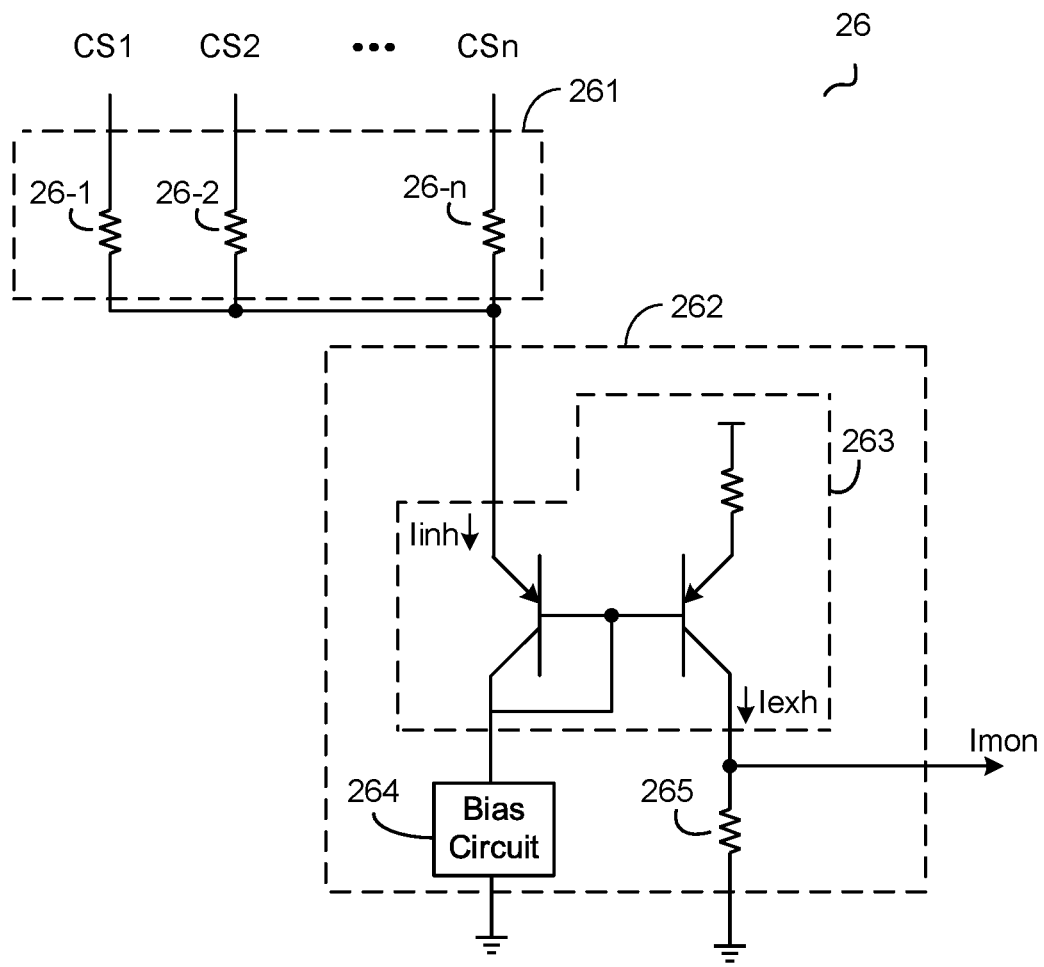
FIG. 4 is a schematic diagram of a total current calculation circuit 26 shown in FIG. 1 in accordance with an embodiment of the present invention.

FIG. 4 is a schematic diagram of a total current calculation circuit 26 shown in FIG. 1 in accordance with an embodiment of the present invention. In one embodiment, the total current calculation circuit 26 comprises a current adding circuit 261 and an output circuit 262. The current adding circuit 261 is coupled to the plurality of switching circuits 10-1, 10-2 . . . 10-*n* to receive the plurality of current sensing signals CS1, CS2 . . . CSn and provides a current adding signal Iinh accordingly, to represent sum of the plurality of current sensing signals CS1+CS2+ . . . +CSn. The output circuit 262 provides a current feedback signal Imon based on the current adding signal Iinh. In one embodiment, the current adding circuit 261 comprises a plurality of resistors 26-1, 26-2 . . . 26-*n*. One terminal of each resistor 26-*i* (i=1, 2 . . . n) receives the corresponding current sensing signal CSi, and the other terminal of each resistor 26-*i* are coupled together to provide the current adding signal Iinh. In one embodiment, the output circuit 262 comprises a current mirror 263, a bias circuit 264, and an output resistor 265. An input terminal of the current mirror 263 receives the current adding signal Iinh, a bias terminal of the current mirror 263 is coupled to the bias circuit 264, and an output terminal of the current mirror 263 provides a mirror current Iexh. The mirror current Iexh flows through the output resistor 265 to provide the current feedback signal Imon. In one embodiment, the current feedback signal Imon could be represented by the following formula (1).

$$Imon = Gain*(CS1 + CS2 + \ldots + CSn) + Bias \quad (1)$$

Where signal Bias represents the voltage at the bias terminal of the output circuit 262. Signal Gain represents the gain brought by the current adding circuit 261 and the current mirror 263.

Figure 5:
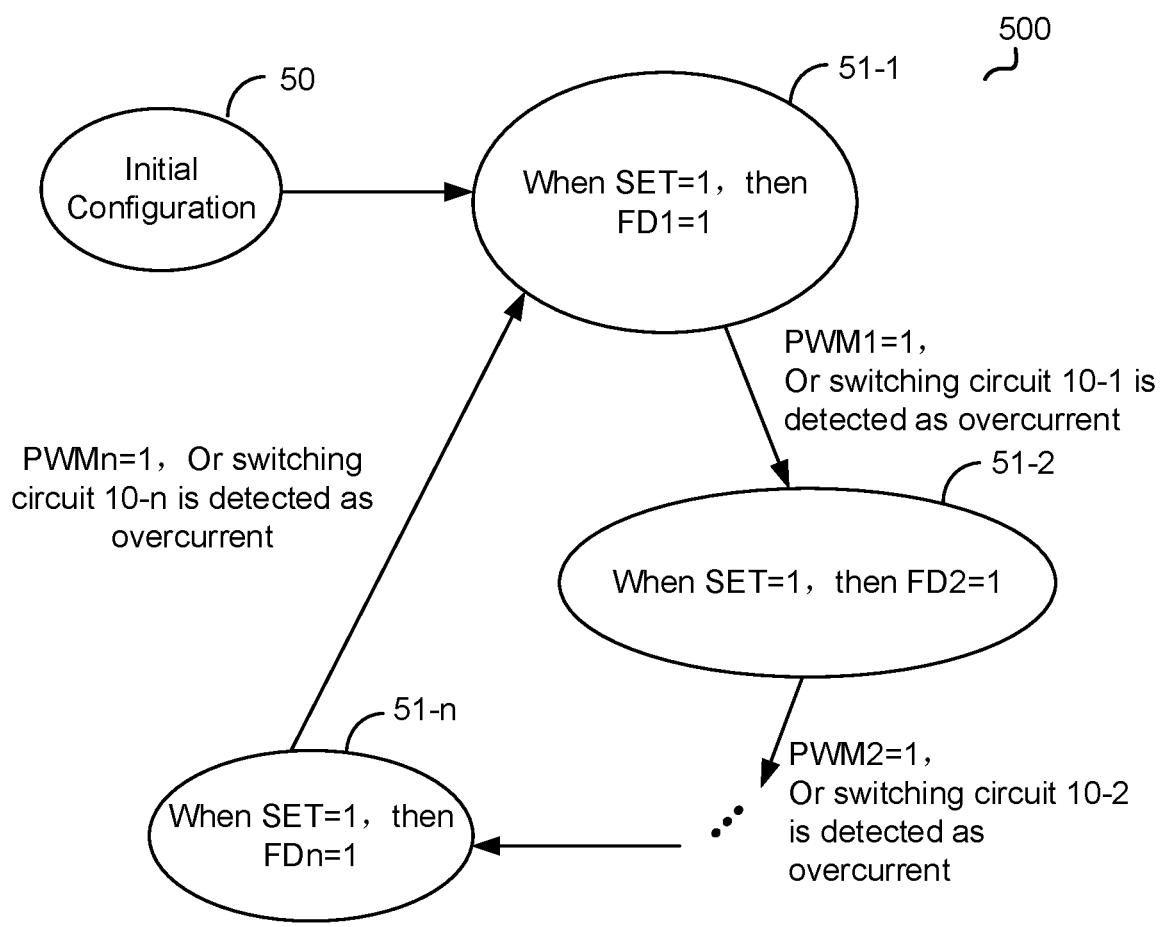
FIG. 5 shows a state transition diagram 500 of a frequency divider 22 shown in FIG. 1 in accordance with an embodiment of the present invention.

FIG. 5 shows a state transition diagram 500 of a frequency divider 22 shown in FIG. 1 in accordance with an embodiment of the present invention, comprising a states 50, and states 51-1, 51-2, . . . 51-*n*.

At the state 50, the frequency division circuit 22 executes an initial configuration, after the initial configuration, transiting to the state 51-1.

At the state 51-1, when the on-time control signal SET is high, then the frequency division signal FD1 is high. When the switching control signal PWM1 turns on the switching circuit 10-1, such as PWM1=1, or when the switching circuit 10-1 is detected as overcurrent, then transiting to the state 51-2.

At the state 51-2, when the on-time control signal SET is high, then the frequency division signal FD2 is high. When the switching control signal PWM2 turns on the switching circuit 10-2, such as PWM2=1, or when the switching circuit 10-2 is detected as overcurrent, then transiting to a next state.

At the state 51-n, when the on-time control signal SET is high, then the frequency division signal FDn is high. When the switching control signal PWMn turns on the switching circuit 10-n, such as PWMn=1, or when switching circuit 10-n is detected as overcurrent, then transiting back to the state 51-1.

Figure 6:
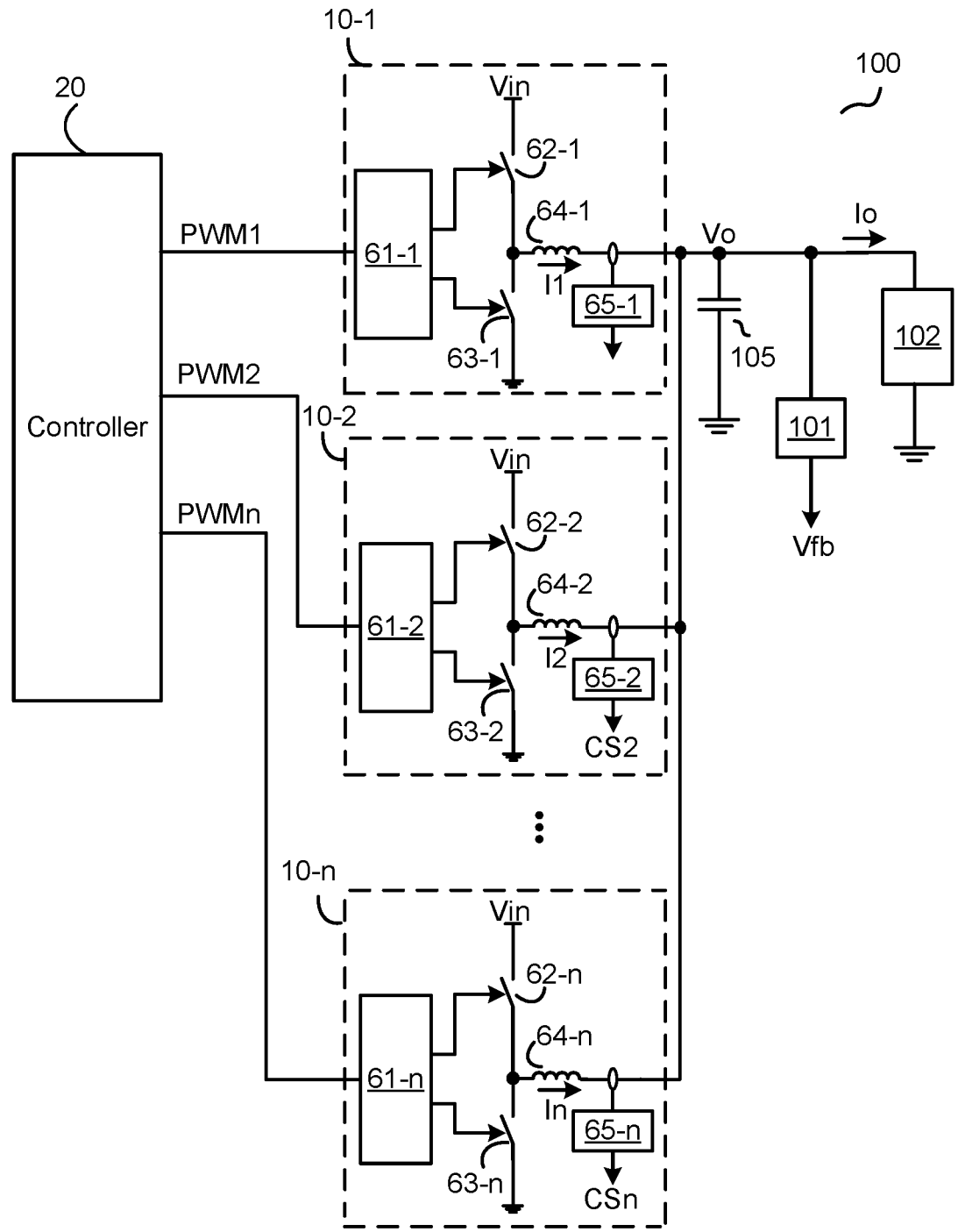
FIG. 6 is a schematic block diagram of the multiphase switching converter 100 in accordance with another embodiment of the present invention.

FIG. 6 is a schematic block diagram of the multiphase switching converter 100 in accordance with another embodiment of the present invention. As shown in FIG. 6, the switching circuit 10-$i$ ($i=1, 2 \ldots n$) comprises a driving circuit 61-$i$, an high-side switch 62-$i$, a low-side switch 63-$i$, and an inductor 64-$i$. Each switching circuit 10-$i$ further comprises a current sensing circuit 65-$i$ for sensing a current flowing through the switching circuit 10-$i$, such as a current flowing through the high-side switch 62-$i$, a current flowing through the low-side switch 63-$i$, or a current flowing through the inductor 64-I as shown in FIG. 6. The current sensing circuit 65-$i$ provides the current sensing signal CSi.

Figure 7:
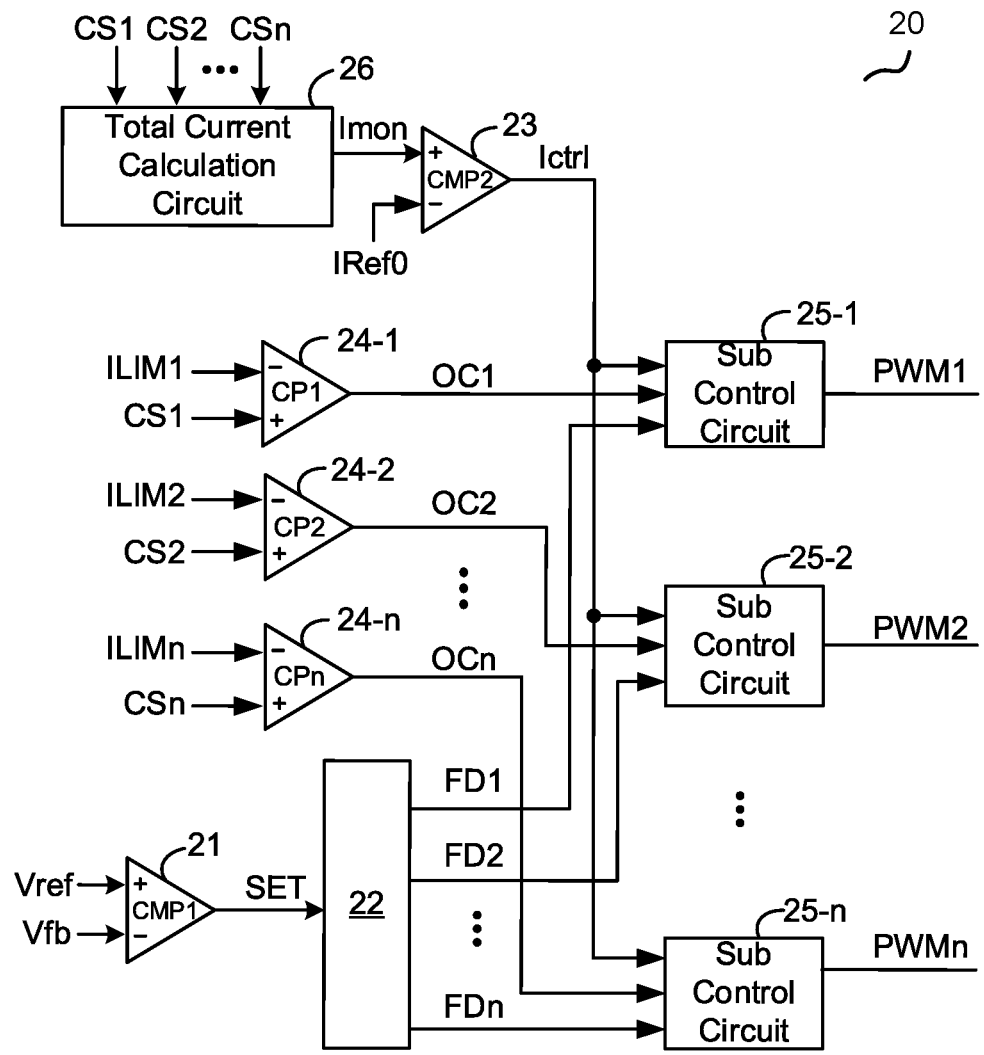
FIG. 7 is a schematic block diagram of the controller 20 in accordance with another embodiment of the present invention.

FIG. 7 is a schematic block diagram of the controller 20 in accordance with another embodiment of the present invention. In the embodiment shown in FIG. 7, the voltage control circuit 21 comprises a comparator CMP1, which has a non-inverting terminal, an inverting terminal and an output terminal. The non-inverting terminal of the comparator CMP1 receives the voltage reference Vref, the inverting terminal of the comparator CMP1 receives the voltage feedback signal Vfb, and the output terminal of the comparator CMP1 provides the on-time control signal SET via comparing the voltage feedback signal Vfb with the voltage reference Vref. The total current control circuit 23 comprises a comparator CMP2, which has a non-inverting terminal, an inverting terminal and an output terminal. The inverting terminal of the comparator CMP2 receives the current reference IRef0, the non-inverting terminal of the comparator CMP2 receives the current feedback signal Imon, and the output terminal of the comparator CMP2 provides the current control signal Ictrl via comparing the current feedback signal Imon with the current reference IRef0. When the current feedback signal Imon is less than the reference IRef0 and the voltage feedback signal Vfb is less than the voltage reference Vref, the controller 20 is configured to turn on a corresponding one of the plurality of switching circuits. In the embodiment shown in FIG. 7, the overcurrent detection circuit 24-1 comprises a comparator CP1 for example, which has a non-inverting terminal, an inverting terminal and an output terminal. The non-inverting terminal of the overcurrent detection circuit 24-1 receives the current sensing signal CS1, the inverting terminal of the overcurrent detection circuit 24-1 receives a defined limit ILIM1, and the output terminal of the overcurrent detection circuit 24-1 provides the overcurrent signal OC1 via comparing the current sensing signal CS1 with the defined limit ILIM1. When the current sensing signal CS1 is larger than the defined limit ILIM1, the overcurrent signal OC1 becomes high to indicate that the switching circuit 10-1 is overcurrent. The overcurrent detection circuit 24-2 comprises a comparator CP2, which has a non-inverting terminal, an inverting terminal and an output terminal. The non-inverting terminal of the overcurrent detection circuit 24-2 receives the current sensing signal CS2, the inverting terminal of the overcurrent detection circuit 24-2 receives a defined limit ILIM2, and the output terminal of the overcurrent detection circuit 24-2 provides the overcurrent signal OC2 via comparing the current sensing signal CS2 with the defined limit ILIM2. When the current sensing signal CS2 is larger than the defined limit ILIM2, the overcurrent signal OC2 becomes high to indicate that the switching circuit 10-2 is overcurrent. Similarly, the overcurrent detection circuit 24-$n$ comprises a comparator CPn, which has a non-inverting terminal, an inverting terminal and an output terminal. The non-inverting terminal of the overcurrent detection circuit 24-$n$ receives the current sensing signal CSn, the inverting terminal of the overcurrent detection circuit 24-$n$ receives a defined limit ILIMn, and the output terminal of the overcurrent detection circuit 24-$n$ provides the overcurrent signal OCn via comparing the current sensing signal CSn with the defined limit ILIMn. When the current sensing signal CSn is larger than the defined limit ILIMn, the overcurrent signal OCn becomes high to indicate that switching circuit 10-$n$ is overcurrent.

Figure 8:
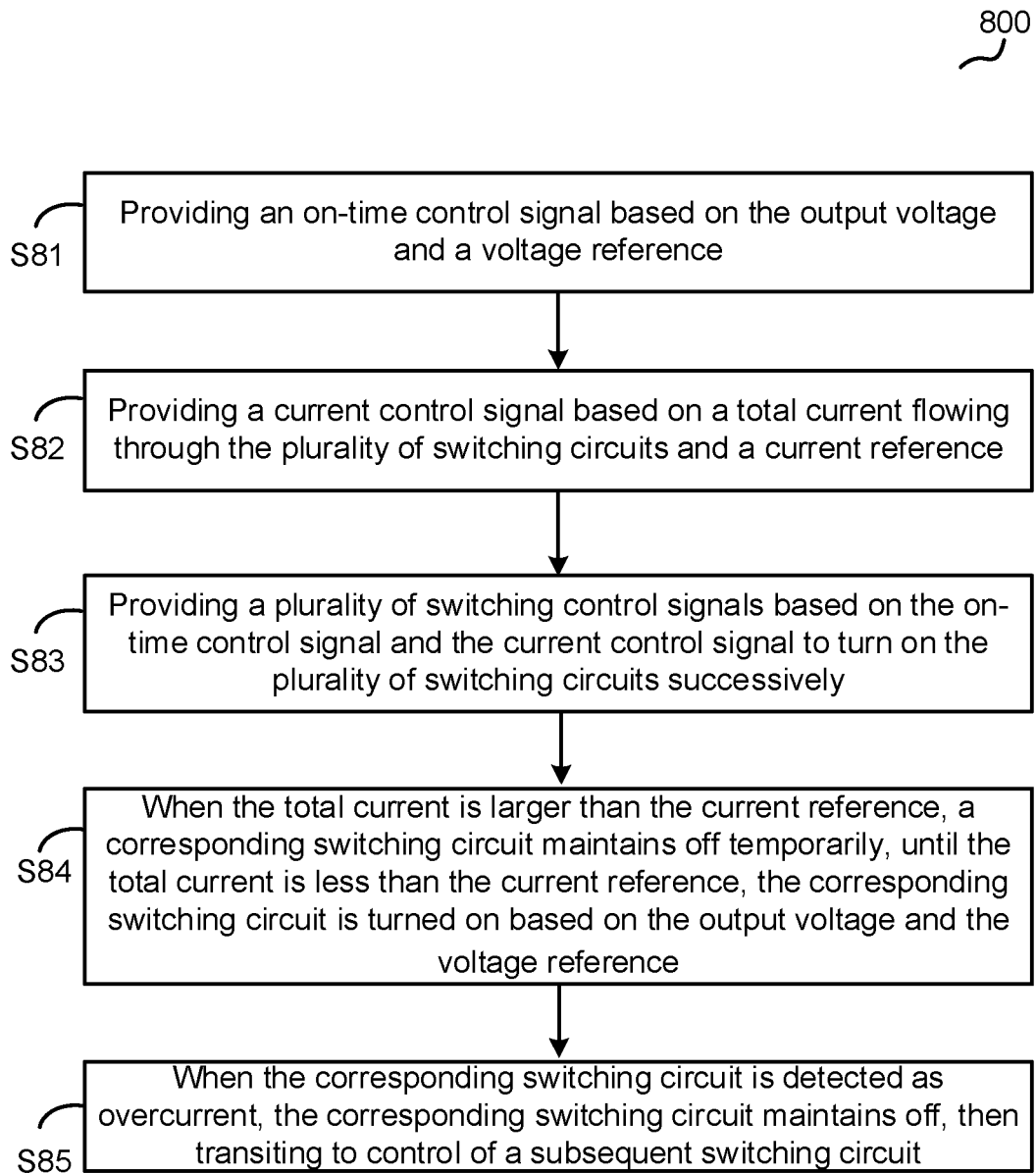
FIG. 8 is a flowchart of a control method 800 for the multiphase switching converter in accordance with another embodiment of the present invention.

FIG. 8 is a flowchart of a control method 800 for the multiphase switching converter in accordance with another embodiment of the present invention, comprising steps S81-85.

At step S81, providing an on-time control signal based on the output voltage and a voltage reference.

At step S82, providing a current control signal based on a total current flowing through the plurality of switching circuits and a current reference.

At step S83, providing a plurality of switching control signals based on the on-time control signal and the current control signal to turn on the plurality of switching circuits successively.

At step S84, when the total current is larger than the current reference, a corresponding switching circuit maintains off temporarily, until the total current is less than the current reference, the corresponding switching circuit is turned on based on the output voltage and the voltage reference.

At step S85, when the corresponding switching circuit is detected as overcurrent, the corresponding switching circuit maintains off, then transiting to control of a subsequent switching circuit.

Note that in the flowchart described above, the functions indicated in the boxes can also occur in a different order than those shown in the figure. Fox example, two boxes presented one after another can actually be executed essentially at the same time, or sometimes in reverse order, depending on the specific functionality involved.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A controller for a multiphase switching converter, the multiphase switching converter having a plurality of switching circuits coupled together to provide an output voltage, the controller comprising:
   a voltage control circuit, configured to provide an on-time control signal based on the output voltage;

a total current control circuit, configured to provide a current control signal based on a total current flowing through the plurality of switching circuits;

a frequency divider, configured to receive the on-time control signal, and provide a plurality of frequency division signals based on the on-time control signal;

a plurality of overcurrent detection circuits, each of the plurality of overcurrent detection circuits is configured to provide an overcurrent signal to indicate whether a corresponding one of the plurality of switching circuits is overcurrent; and a plurality of sub control circuits, configured to provide a plurality of switching control signals to control the plurality of switching circuits respectively, each of the plurality of sub control circuits is configured to receive a corresponding one of the plurality of frequency division signals, the current control signal and the overcurrent signal, and provide a corresponding one of the plurality of switching control signals accordingly; wherein when the total current is larger than a current reference, maintaining a corresponding one of the plurality of switching circuits off temporarily, until the total current is less than the current reference, turning on the corresponding one of the plurality of switching circuits based on the output voltage.

2. The controller of claim 1, further comprising:

a total current calculation circuit, having a plurality of input terminals and an output terminal, the plurality of input terminals are coupled to the plurality of switching circuits to receive a plurality of current sense signals respectively, and the output terminal is configured to provide a current feedback signal representative of the total current based on the plurality of current sense signals, wherein each respective one of the plurality of current sense signals represents a current flowing through a corresponding one of the plurality of switching circuits.

3. The controller of claim 2, wherein the total current calculation circuit further comprises:

a current adding circuit, configured to provide a current adding signal representative of a sum of the plurality of current sense signals; and an output circuit, configured to provide the current feedback signal based on the current adding signal.

4. The controller of claim 1, wherein the total current control circuit further comprises:

a first comparator, configured to provide the current control signal via comparing a current feedback signal with the current reference, wherein the current feedback signal represents the total current flowing through the plurality of switching circuits.

5. The controller of claim 1, wherein the voltage control circuit further comprises:

a second comparator, configured to provide the on-time control signal via comparing a voltage feedback signal with a voltage reference, wherein the voltage feedback signal is provided based on the output voltage.

6. The controller of claim 1, wherein each of the plurality of sub control circuits further comprises:

a logic circuit, having a first input terminal, a second input terminal, a third input terminal, and an output terminal, wherein the first input terminal is configured to receive one of the plurality of frequency division signals, the second input terminal is configured to receive the current control signal, the third input terminal is configured to receive the overcurrent signal, and the output terminal is configured to provide a set signal based on the one of the plurality of frequency division signals, the current control signal and the overcurrent signal; and a RS flip-flop, having a set terminal, a reset terminal, and an output terminal, wherein the set terminal is configured to receive the set signal, the reset terminal is configured to receive an on-time period control signal, and the output terminal is configured to provide one of the plurality of switching control signals based on the set signal and the on-time period control signal, the on-time period control signal is configured to control an on-time period of the one of the plurality of switching circuits.

7. The controller of claim 1, wherein when the total current is less the current reference, the corresponding one of the plurality of switching circuits is turned on based on the output voltage.

8. The controller of claim 1, wherein when the corresponding one of the plurality of switching circuits is detected as overcurrent, maintaining the corresponding one of the plurality of switching circuits off, and transiting to control a subsequent one of the plurality of switching circuits based on the output voltage and the total current.

9. A control method for a multiphase switching converter, the multiphase switching converter having a plurality of switching circuits coupled together to provide an output voltage, the control method comprising:

providing an on-time control signal based on the output voltage;

providing a current control signal based on the total current flowing through the plurality of switching circuits;

providing a plurality of switching control signals to turn on the plurality of switching circuits successively based on the on-time control signal and the current control signal;

when the total current is larger than a current reference, maintaining a corresponding one of the plurality of switching circuits off temporarily, until the total current is less than the current reference, turning on the corresponding one of the plurality of switching circuits based on the output voltage; and when a current flowing through the corresponding one of the plurality of switching circuits has exceeded a defined limit, then maintaining the corresponding one of the plurality of switching circuits off, and transiting to control a subsequent one of the plurality of switching circuits.

10. The control method of claim 9, further comprising:

providing a plurality of frequency division signals based on the on-time control signal;

providing a plurality of overcurrent signals based on a plurality of currents and the defined limit, each of the plurality of currents flows through one of the plurality of switching circuits;

providing the plurality of switching control signals based on the plurality of frequency division signals, the current control signal, and the plurality of overcurrent signals;

turning on the corresponding one of the plurality of switching circuits based on a corresponding one of the plurality of frequency division signals, the current control signal and a corresponding one of the plurality of overcurrent signals; and turning off the corresponding one of the plurality of switching circuits based on an on-time signal representative of an on-time period.

11. The control method of claim 9, further comprising:
receiving a plurality of current sense signals, each of the plurality of current sense signals represents a current flowing through one of the plurality of switching circuits; and
providing the total current based on a sum of the plurality of current sense signals.

12. A controller for a multiphase switching converter, the multiphase switching converter having a plurality of switching circuits coupled together to provide an output voltage, the controller comprising:
a voltage control circuit, configured to provide an on-time control signal based on the output voltage;
a total current control circuit, configured to provide a current control signal based on a total current flowing through the plurality of switching circuits;
a frequency divider, configured to receive the on-time control signal, and provide a plurality of frequency division signals based on the on-time control signal; and
a plurality of sub control circuits, configured to provide a plurality of switching control signals to control the plurality of switching circuits respectively, each of the plurality of sub control circuits is configured to receive one of the plurality of frequency division signals and the current control signal, and provide one of the plurality of switching control signals; wherein
when the total current is larger than a current reference, maintaining a corresponding one of the plurality of switching circuits off temporarily, until the total current is less than the current reference, turning on the corresponding one of the plurality of switching circuits based on the output voltage.

13. The controller of claim 12, wherein the total current control circuit further comprises:
a first comparator, configured to receive a current feedback signal representative of the total current, and provide the current control signal via comparing the current feedback signal with the current reference.

14. The controller of claim 12, wherein the voltage control circuit further comprises:
a second comparator, configured to receive a voltage feedback signal representative of the output voltage, and provide the on-time control signal via comparing the voltage feedback signal with a voltage reference.

15. The controller of claim 12, wherein each of the plurality of sub control circuits further comprises:
a logic circuit, having a first input terminal, a second input terminal and an output terminal, wherein the first input terminal is configured to receive one of the plurality of frequency division signals, the second input terminal is configured to receive the current control signal, and the output terminal is configured to provide a set signal based on the one of the plurality of frequency division signals and the current control signal; and
a RS flip-flop, having a set terminal, a reset terminal, and an output terminal, wherein the set terminal is configured to receive the set signal, the reset terminal is configured to receive an on-time period control signal, the output terminal is configured to provide one of the plurality of switching control signals, and the on-time period control signal is configured to control an on-time period of the one of the plurality of switching circuits.

16. The controller of claim 12, wherein when the total current is less than the current reference, a corresponding one of the plurality of switching circuits is turned on based on the output voltage.

17. The controller of claim 12, wherein when a corresponding one of the plurality of switching circuits is detected as overcurrent, maintaining the corresponding one of the plurality of switching circuits off, and transiting to control a subsequent one of the plurality of switching circuits.

18. A controller for a multiphase switching converter, the multiphase switching converter having a plurality of switching circuits coupled together to provide an output voltage, the controller comprising:
a plurality of sub control circuits, configured to provide a plurality of switching control signals to turn on the plurality of switching circuits successively based on the output voltage; wherein
when a total current flowing through the plurality of switching circuits is larger than a current reference, maintaining a corresponding one of the plurality of switching circuits off temporarily, until the total current is less than the current reference, turning on the corresponding one of the plurality of switching circuits based on the output voltage.

19. The controller of claim 18, further comprising:
a voltage control circuit, configured to provide an on-time control signal based on the output voltage; and
a total current control circuit, configured to provide a current control signal based on the total current flowing through the plurality of switching circuits; wherein
the plurality of sub control circuits are configured to control the plurality of switching circuits based on the on-time control signal and the current control signal.

20. The controller of claim 19, wherein each of the plurality of sub control circuits further comprises:
a logic circuit, configured to provide a set signal based on the on-time control signal and the current control signal; and
a RS flip-flop, configured to provide one of the plurality of switching control signals based on the set signal and an on-time period control signal, wherein the on-time period control signal is configured to control an on-time period of one of the plurality of switching circuits.

* * * * *